June 6, 1967 M. BRENNER 3,324,387
METHOD AND APPARATUS EMPLOYING A CHARGED CAPACITOR INDICATOR FOR AUTOMATIC TESTING OF BREAKDOWN CHARACTERISTICS OF ELECTRONIC DEVICES SUCH AS COLD-CATHODE DIODES
Filed Feb. 26, 1964
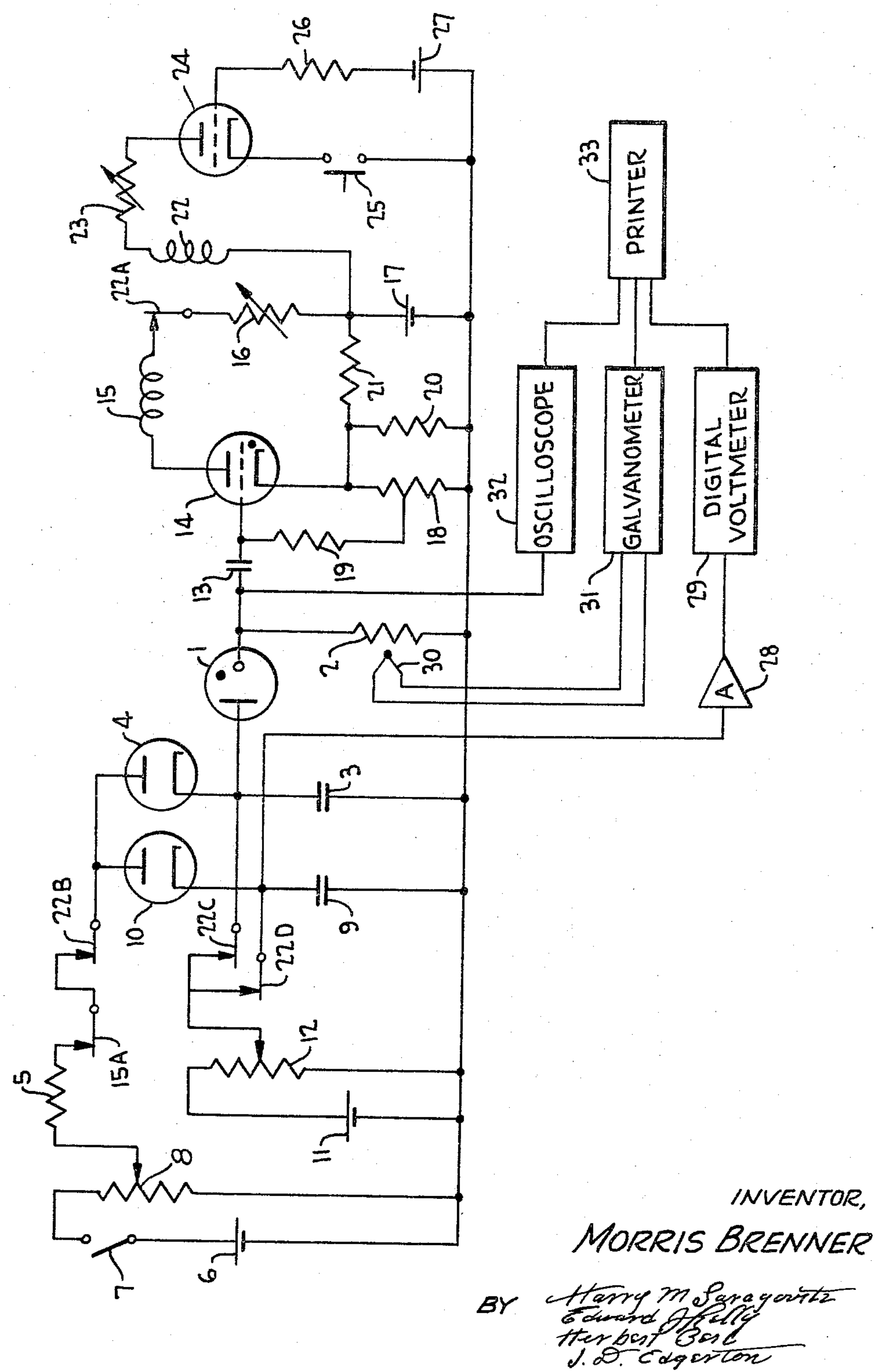
INVENTOR,
MORRIS BRENNER
BY Harry M. Saragovitz
Edward J. Kelly
Herbert Berl
J. D. Edgerton 3,324,387

METHOD AND APPARATUS EMPLOYING A CHARGED CAPACITOR INDICATOR FOR AUTOMATIC TESTING OF BREAKDOWN CHARACTERISTICS OF ELECTRONIC DEVICES SUCH AS COLD-CATHODE DIODES

Morris Brenner, Washington, D.C., assignor to the United States of America as represented by the Secretary of the Army Filed Feb. 26, 1964, Ser. No. 347,627
8 Claims. (Cl. 324—24)

The invention described herein may be manufactured and used by or for the Government of the United States of America for governmental purposes without the payment to me of any royalty thereon.

This invention relates generally to automatic testing systems for measuring voltage breakdown, and more particularly to an automatic testing system for simultaneously measuring the breakdown voltage, the energy transferred, and the energy transfer time of cold cathode diodes.

The cold cathode diode is a special form of gas-filled electron tube used extensively as a voltage regulator or voltage-reference. Such diodes also find application as a trigger tube in energy transfer circuits of ordinance devices. The voltages at which the diode breaks down, the energy transferred while it is in a conducting state, and the time taken for this energy transfer are the three critical parameters in the specification of this component. Ordinarily, each of these parameters is measured independently. Test data are observed visually and recorded manually. Since these parameters are interdependent rather than independent, the performance data from this type of testing do not adequately reflect the performance of the diode at breakdown.

It is therefore an object of the invention to provide a testing system for simultaneously measuring the breakdown voltage, the energy transferred, and the energy transfer time of cold cathode diodes.

It is another object of the invention to provide an automatic testing system for measuring a plurality of parameters of cold cathode diodes and automatically recording the data measured.

According to the present invention, the foregoing and other objects are attained by connecting the cold cathode diode under test across a firing circuit comprising a capacitor that is charged through a resistor and a vacuum diode in series. When the capacitor is charged to the breakdown voltage of the cold cathode diode, the capacitor discharges through a load until the voltage across the capacitor equals the quenching voltage of the cold cathode diode. The voltage at which breakdown occurs is monitored by a reading circuit comprising another capacitor in parallel with the first capacitor but decoupled from it by another vacuum diode. The firing circuit and the reading circuit are substantially electrically symmetrical so that the charging of the reading capacitor is in step with the charging of the firing capacitor to assure equal voltages on the two capacitors. Circuitry connected to the second capacitor and the load makes a simultaneous record of the breakdown voltage, energy transferred during breakdown, and energy transfer time.

The specific nature of the invention, as well as other objects, aspects, uses and advantages thereof, will clearly appear from the following description and from the accompanying drawing, in which the sole figure is a partial schematic and partial block diagram of a preferred embodiment of the present invention.

Referring now to the drawing wherein there is shown the cold cathode diode 1 under test in series with load resistor 2 connected across firing capacitor 3. Capacitor 3 is connected by way of vacuum diode 4, normally closed relay switches 22B and 15A, and current limiting resistor 5 to a source of voltage which comprises battery 6 connected in series with switch 7 and potentiometer 8. Reading capacitor 9 is connected in parallel with firing capacitor 3 but decoupled from it by vacuum diode 10. Firing capacitor 3 and reading capacitor 9 are connected to a source of initial condition voltage by way of normally open relay switches 22C and 22D, respectively. The source of initial condition voltage comprises a voltage divider circuit consisting of battery 11 and potentiometer 12. The voltage divider circuit together with relay switches 22C and 22D insure that both the firing and the reading capacitors 3 and 9, respectively, are charged to the same initial voltage at the start of the test. Voltage pulses developed across load resistor 2 are coupled to a control circuit by capacitor 13. The control circuit is of conventional design comprising thyration tube 14 having relay coil 15, normally closed relay switch 22A, and variable load resistor 16 connected in series with a source of plate supply voltage comprising battery 17. The grid bias voltage for thyratron tube 14 is developed by potentiometer 18, in the cathode circuit of tube 14, and grid resistor 19. The potential at the cathode of tube 14 is established by the voltage divider comprising resistor 21 in series with resistor 20 connected in parallel with potentiometer 18. There is additionally provided a reset circuit comprising vacuum triode 24 having relay coil 22 and variable load resistor 23 connected in series with a source of plate supply voltage comprising battery 17. Grid bias for triode 24 is established by grid resistor 26 and a source of bias voltage comprising battery 27. The cathode of triode 24 is connected to the ground return circuit through normally open reset push button switch 25.

In operation, firing capacitor 3 is charged through current limiting resistor 5 and vacuum diode 4 until the voltage across capacitor 3 reaches the breakdown voltage of cold cathode diode 1 under test. Under this condition, diode 1 conducts allowing capacitor 3 to discharge through load resistor 2. When the voltage across capacitor 3 reaches the quenching voltage of diode 1, diode 1 ceases to conduct. At the same time that firing capacitor 3 is charging through current limiting resistor 5, reading capacitor 9 is also charging through current limiting resistor 5 and vacuum diode 10. The symmetry of the firing circuit and the reading circuit about the junction of the anodes of diodes 4 and 10 assures the same charging rate for the reading capacitor 9 as for the firing capacitor 3. When capacitor 3 discharges through load resistor 2 a positive voltage pulse developed across resistor 2 which is coupled to the grid of thyratron 14 by capacitor 13. This voltage pulse causes thyratron 14 to conduct thereby activating relay coil 15 which causes relay switch 15A to open. When relay switch 15A opens, firing capacitor 3 and reading capacitor 9 are disconnected from their source of charging current. Because of the decoupling characteristics of vacuum diodes 4 and 10, reading capacitor 9 holds the voltage at which breakdown of diode 1 occurred and is unaffected by the discharge of firing capacitor 3. The circuit is reset for a new test by pushing reset button 25 thereby connecting the cathode of triode 24 to the ground return circuit which causes triode 24 to conduct. This activates relay coil 22 which causes relay switch 22A to open causing thrytron 14 to stop conducting. Relay switch 15A then assumes its normally closed position; however, relay switch 22B opens and thereby disconnects capacitors 3 and 9 from the source of charging voltage comprising battery 6. Instead the capacitors 3 and 9 are connected to the initial condition voltage source comprising battery 11 by way of relay switches 22C and 22D, respectively, which are then closed. The initial condition voltage is adjusted by adjusting potentiometer 12. During reset the capacitors 3 and 9 assume an initial charge determined by the initial condition voltage. When the reset button 25 is released, relay coil 22 is deactivated, and relay switches 22A and 22B close while relay switches 22C and 22D open. The circuit is then ready to perform a new test on another cold cathode diode 1.

The reading capacitor 9 is connected to digital voltmeter 29 through voltage coupler 28. The voltage coupler 28 is shown as an operational amplifier and performs the function of isolating capacitor 9 to prevent its discharge. The digital voltmeter 29 measures the breakdown voltage.

The energy dissipated in the load 2 between the time of breakdown and the time of quench of test diode 1 is referred to as the energy transfer of diode 1. Mathematically the energy is expressed as follows:

$$W=\int_0^t \frac{E^2}{R}dt$$

where E is the voltage across the load R. Measurement of the energy transfer is accomplished by thermocouple 30 in combination with galvanometer 31. Thermocouple 30 is responsive to the square of the average current through load resistor 2; therefore, it approximates the expression for energy set forth above. The deflection of the galvanometer 31 is then an indication of the energy transferred. Galvanometer 31 may be the reflected beam type having the light beam masked so that it appears as a lighted half-moon on the scale with the vertical edge set to the zero reference of the galvanometer. The scale, instead of being calibrated, may have a narrow vertical-slit photoelectric pickup mounted in a position corresponding to the specification for minimum energy transfer. When the galvanometer deflects to this point, the photoelectric circuit is triggered to provide an output. Alternatively or in addition, should a record of the actual energy transferred be required, a photograph of the deflection of the galvanometer may be obtained by taking a continuous exposure of the spot of light on the scale during a test. The galvanometer may be omitted by connecting the thermocouple 30 to digital voltmeter 29 by way of a load resistance and an isolation amplifier providing an analog memory function (not shown). The digital voltmeter would then measure a voltage developed across the load resistor which is proportional to the energy transferred. Connection of thermocouple 30 to voltmeter 29 would, of course, require that the inputs to voltmeter 29 be multiplexed. Should it be desired to measure the energy transferred more precisely then that which the thermocouple 30 and digital voltmeter 29 combination is capable, thermocouple 30 could be omitted and the energy equation may be instrumented by a squaring circuit and an integrating circuit, both of which circuits are well known in the instrumentation art. The output of the integrating circuit would be connected to an input of the digital voltmeter 29.

Measurement of the energy transfer time is obtained from an oscilloscope display of the voltage drop across the load resistor 2 as a function of time. Before the diode 1 under test conducts, its cathode is at ground potential. When diode 1 breaks down, the voltage across load resistor 2 rises rapidly and then drops back to zero when diode 1 quenches. The interval between the time of break down and the time of quench is the transfer time. A photoelectric pickup is mounted on the screen of the oscilloscope 32 at a position corresponding to the specification or maximum time limit. If the diode 1 under test fails to quench after the lapse of the specification time limit, the output of the photoelectric pickup is blocked or inhibited. Should a record of the actual energy transfer time be required, an oscillographic record of the voltage across resistor 2 may be made.

The outputs of digital voltmeter 29 and the photoelectric pickup circuits of galvanometer 31 and oscilloscope 32 are provided as inputs to printer 33. The lack of an output from either of the photoelectric pickup circuits is printed as a "NO-GO" or "reject." Printer 33 may be controlled by a relay switch (not shown) operated by relay coil 15 in thyratron control circuit.

The circuit described is used in reliability studies requiring statistical testing of component voltage breakdown by adding a switch (not shown) in series with the component under test (e.g. diode 1) and the junction with firing capacitor 3. A voltage comparator (not shown) which has been programmed to close the switch at preset increments of test voltage is connected to and monitors the voltage measured by voltmeter 29. Statistical data representing the number of voltage breakdowns of a component under test for a given number of switch closures at preset values of firing voltage are accumulated.

It will be apparent that the embodiment shown is only exemplary. For example, other and different components may be tested by the circuit described such as detonators for explosive devices. Obviously various modifications can be made in construction and arrangement within the scope of the invention as defined in the appended claims.

I claim as my invention:

1. An automatic testing system comprising:

(a) a source of voltage (b) a current-limiting impedance connected to said source of voltage, (c) a firing circuit connected in series with said current-limiting impedance and said source of voltage, comprising (1) a first dode and (2) a first charging capacitor connected in series, (d) a monitoring circuit connected in series with said limiting impedance and said source of voltage and connected in parallel with said firing circuit, comprising (1) a second diode and (2) a second charging capacitor connected in series, (e) first means for connecting a component to be tested across said first charging capacitor, (f) second means connected to said second capacitor for measuring the voltage thereacross, (g) a load impedance connected in series with said first means, (h) third means connected to said load impedance for measuring the energy transferred by the component under test, (i) four means connected to said load impedance for measuring the energy transfer time of the component under test, (j) a first switch connected between said current-limiting impedance and said first and second diodes, (k) fifth means connected to said load impedance and responsive to the voltage thereacross for opening said first switch, (l) a second switch connected in series with said first first switch, (m) a source of initial condition voltage, (n) a third switch connected said source of initial condition voltage to said first capacitor, (o) a fourth switch connecting said source of initial condition voltage to said second capacitor, and (p) sixth means for causing said first, third and fourth switches to close and said second switch to open at the end of a test and then for causing said third and fourth switches to open and said second switch to close at the beginning of another test.

2. A system according to claim 1 comprising additionally:

(a) seventh means connected to said first, third, and fourth means for making a permanent record of the qualities measured.

3. A method of testing the voltage-breakdown characteristics of an electronic component, comprising the steps of:

(a) connecting said component, in series with a load resistor, across a firing capacitor, (b) charging said firing capacitor from a source of fixed voltage through a series-connected combination of a resistance and a first diode, said diode being connected between said resistance and said firing capacitor, (c) simultaneously charging a reading capacitor through a second diode, the terminal of said second diode remote from said reading capacitor being connected to the terminal of said first diode remote from said firing capacitor and the terminal of said reading capacitor remote from said second diode being connected to the terminal of said firing capacitor remote from said first diode, (d) interrupting the charging of both said capacitors when current begins to flow through said load resistor as a result of breakdown of said component, by automatic means responsive to the beginning of said current, and (e) measuring the voltage across said reading capacitor and thereby obtaining a measure of the breakdown voltage of said component.

4. The method of claim 3 comprising the additional step of measuring the energy dissipated in said load resistor between the time at which voltage breakdown begins and the time at which current ceases to flow through said component as a result in loss of charge from said firing capacitor, thereby obtaining a measure of energy transferred during breakdown.

5. The method of claim 4 wherein said additional step comprises placing a thermocouple in proximity to said load resistor and measuring the output of said thermocouple.

6. The method of claim 3 comprising the additional step of measuring the time from beginning of voltage breakdown until cessation of curent flow through said component, thereby obtaining a measure of energy transfer time.

7. The method of claim 6 wherein said additional step comprises connecting the junction of said component and said load resistor to an oscilloscope and measuring said time on said oscilloscope.

8. The method of claim 3 comprising the additional steps of (a) measuring the energy dissipated in said load resistor between the time at which voltage breakdown begins and the time at which current ceases to flow through said component as a result of loss of charge from said firing capacitor, (b) measuring the time interval between the time at which voltage breakdown begins and the time at which current ceases to flow through said component as a result of loss of charge from said firing capacitor, and (c) recording on an automatic recording instrument a simultaneous record of breakdown voltage, energy transfer, and time interval thus measured.

References Cited

UNITED STATES PATENTS

| | | | |
|---|---|---|---|
| 2,823,368 | 2/1958 | Avery | 340—173 |
| 2,983,864 | 5/1961 | Gibson | 324—158 X |
| 3,054,954 | 9/1962 | Boscia | 324—158 |
| 3,086,158 | 4/1963 | Thomsen | 320—1 |
| 3,129,418 | 4/1964 | De LaTour | 340—173 X |
| 3,159,825 | 12/1964 | Bianchi | 324—111 X |

WALTER L. CARLSON, *Primary Examiner.*

E. L. STOLARUN, *Assistant Examiner.*